(12) United States Patent
Grillo et al.

(10) Patent No.: US 9,933,012 B1
(45) Date of Patent: Apr. 3, 2018

(54) BEARING CENTERING SPRING WITH INTEGRAL OUTER RINGS

(71) Applicant: United Technologies Corporation, Hartford, CT (US)

(72) Inventors: Joseph Grillo, Bloomfield, CT (US); Kevin Duffy, Hartford, CT (US); Ronnie K. Kovacik, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 486 days.

(21) Appl. No.: 14/616,990

(22) Filed: Feb. 9, 2015

(51) Int. Cl.
*F16C 27/00* (2006.01)
*F16C 27/04* (2006.01)

(52) U.S. Cl.
CPC ................... *F16C 27/045* (2013.01)

(58) Field of Classification Search
CPC .... F16C 27/045; F16C 33/581; F16C 33/586; F16C 33/58; F16C 19/54; F01D 25/164; F02C 7/06
See application file for complete search history.

(56) References Cited

U.S. PATENT DOCUMENTS

| | | | |
|---|---|---|---|
| 2,436,768 A | 2/1948 | Griffith et al. | |
| 3,168,359 A | 2/1965 | Murphy | |
| 3,370,899 A | 2/1968 | Eklund | |
| 3,649,093 A | 3/1972 | Muratore et al. | |
| 3,727,467 A | 4/1973 | Hurlburt | |
| 3,773,396 A | 11/1973 | Easley | |
| 3,809,447 A | 5/1974 | Ingemar et al. | |
| 3,868,151 A | 2/1975 | Derner | |
| 3,980,352 A | 9/1976 | Carlson | |
| 5,407,284 A | 4/1995 | Vinciguerra et al. | |
| 5,411,335 A | 5/1995 | Driver | |
| 6,413,046 B1 | 7/2002 | Penn et al. | |
| 6,439,772 B1 | 8/2002 | Ommundson et al. | |
| 6,443,698 B1 | 9/2002 | Corattiyil et al. | |
| 6,651,398 B2 | 11/2003 | Gregori | |
| 7,384,199 B2 | 6/2008 | Allmon et al. | |
| 8,182,153 B2 | 5/2012 | Singh et al. | |
| 8,439,637 B2 | 5/2013 | DiBenedetto et al. | |
| 8,747,054 B2 | 6/2014 | Witlicki | |
| 8,834,095 B2 | 9/2014 | Davis | |
| 8,845,277 B2 | 9/2014 | Davis | |
| 2011/0286836 A1 | 11/2011 | Davis | |
| 2012/0213629 A1 | 8/2012 | Rouesne | |
| 2013/0089284 A1 | 4/2013 | Cazaux et al. | |
| 2013/0108202 A1 | 5/2013 | Do et al. | |
| 2013/0280063 A1 | 10/2013 | Ganiger et al. | |
| 2014/0219594 A1 | 8/2014 | Lee et al. | |
| 2014/0254967 A1 | 9/2014 | Gonzalez | |
| 2014/0255157 A1 | 9/2014 | Meacham et al. | |

FOREIGN PATENT DOCUMENTS

| | | |
|---|---|---|
| EP | 2703665 A1 | 3/2014 |
| GB | 835529 A | 5/1960 |
| GB | 1162900 A | 8/1969 |

OTHER PUBLICATIONS

Extended European Search Report for EP Application No. 15198670.0, dated Aug. 18, 2016, 7 pages.

*Primary Examiner* — Thomas R Hannon
(74) *Attorney, Agent, or Firm* — Kinney & Lange, P.A.

(57) ABSTRACT

A bearing centering spring includes a cylindrical body with outer rings at each end, wherein each outer ring has outer raceways on the inner surface of the body. There is also a retaining feature on an end of the body and ports through the body that are positioned between the outer rings.

17 Claims, 3 Drawing Sheets

BEARING CENTERING SPRING WITH INTEGRAL OUTER RINGS

STATEMENT OF GOVERNMENT INTEREST

This invention was made, at least in part, with U.S. Government support under contract number W911W6-08-2-0001, awarded by the Army. The U.S. Government may have certain rights in this invention.

BACKGROUND

The present invention relates generally to gas turbine engines and, more particularly, to a bearing arrangement a gas turbine engine.

A gas turbine engine typically includes a high pressure spool, a combustion system and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a low pressure compressor connected to a forward end of the low pressure shaft, forward of the high pressure compressor. The combustion system is disposed between the high pressure compressor and the high pressure turbine and receives compressed air from the compressors and fuel provided by a fuel injection system. A combustion process is carried out within the combustion system to produce high energy gases to produce thrust and turn the high and low pressure turbines, which drive the compressors to sustain the combustion process.

Gas turbine engines used in certain applications, such as helicopters and industrial power generation, include a third spool that is a power spool. The power spool includes a power turbine, which is disposed downstream of the low pressure turbine, and a power shaft, which typically extends forward coaxially through the high and low pressure shafts. The power shaft provides torque that can turn, for example, a rotor or a generator.

The high and low pressure spools as well as the power spool include alternating cascades of stators and rotors in order to work on the primary fluid in the flow path. Because the stators are stationary but the rotors rotate, bearings are necessary to permit the relative motion. In order to enable precise rotation of the shafts while maintaining a reasonable overall engine length, bearings are sometimes positioned relatively close to one another.

SUMMARY

According to one embodiment of the present invention, a bearing centering spring includes a cylindrical body with outer rings at each end, wherein each outer ring has outer raceways on the inner surface of the body. There is also a retaining feature on an end of the body and ports through the body that are positioned between the outer rings.

DETAILED DESCRIPTION

Figure 1:
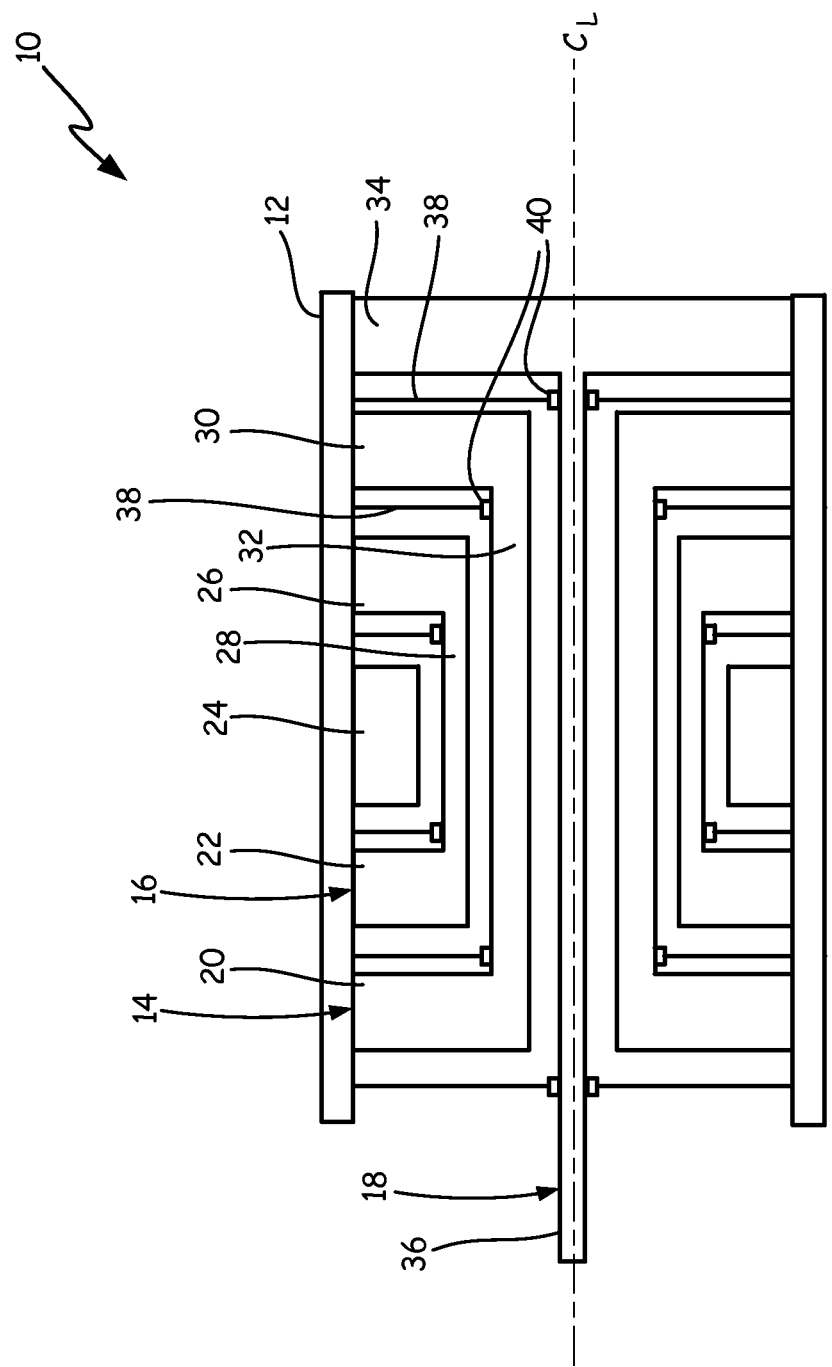
FIG. 1 is a schematic side cross-section view of a gas turbine engine.

In FIG. 1, a cross section of gas turbine engine 10 is shown. Although FIG. 1 depicts a gas turbine engine typically used for a helicopter, the invention is readily applicable to industrial power generators and other similar systems incorporating rotor-supported, shaft-driven turbines. Shown in FIG. 1 are gas turbine engine 10, case 12, low spool 14, high spool 16, power spool 18, low pressure compressor (LPC) 20, high pressure compressor (HPC) 22, combustor 24, high pressure turbine (HPT) 26, high shaft 28, low pressure turbine (LPT) 30, low shaft 32, power turbine 34, power shaft 36, static members 38, bearing arrangements 40, and longitudinal engine centerline axis $C_L$.

In the illustrated embodiment, gas turbine engine 10 comprises a three-spool turboshaft engine in which the advantages of the present invention are particularly well illustrated. Gas turbine engine 10, of which the operational principles are well known in the art, comprises case 12 that surrounds low spool 14, high spool 16, and power spool 18, which are each concentrically disposed around longitudinal engine centerline axis $C_L$. At the front of gas turbine engine 10 is LPC 20, and downstream of LPC 20 is HPC 22. Combustor 24 is downstream of HPC 22, and HPT 26 is downstream of combustor 24. HPT 26 is connected to HPC 22 via high shaft 28 to comprise high spool 16. LPT 30 is downstream of HPT 26, and LPT 30 is connected to LPC 20 via low shaft 32 to comprise low spool 14. Low shaft 32 extends concentrically through the interior of high shaft 28. Power turbine 34 is downstream of LPT 30 and is connected to power shaft 36 to comprise power spool 18. Power shaft 36 extends concentrically through the interiors of high shaft 28 and low shaft 32. Power shaft 36 extends past the front of the engine and, for use in a helicopter, is connected to a gearbox (not shown).

While not shown in detail in FIG. 1, each of LPC 20, HPC 22, HPT 26, LPT 30, and power turbine 34 are separated into static components and rotating components. The static components are connected to case 12, and the rotating components are connected to one of shafts 28, 32, and 36, respectively. Shafts 28, 32, and 36 are supported by a plurality of static members 38, and relative motion is allowed because each static member 38 connects to one of shafts 28, 32, and 36 through one of the plurality of bearing arrangements 40.

During normal operation, air enters case 12 and is compressed by LPC 20 and further compressed by HPC 22. The compressed air is delivered to combustor 24 along with fuel, and the mixture is combusted. The combustion process produces the high energy gases necessary to turn HPT 26 and LPT 30, which turn HPC 22 and LPC 20, respectively, thus sustaining the operation of gas turbine engine 10. The high energy gasses also turn power turbine 34, and the torque from power turbine 34 can be used, for example, to turn a rotor of a helicopter.

The components and configuration of gas turbine engine 10 as shown in FIG. 1 allow for air and fuel to be used to generate torque that can be used externally to gas turbine engine 10. This is possible, in part, due to the plurality of bearing arrangements 40 which support and permit rotation of some components of gas turbine engine 10.

Figure 2:
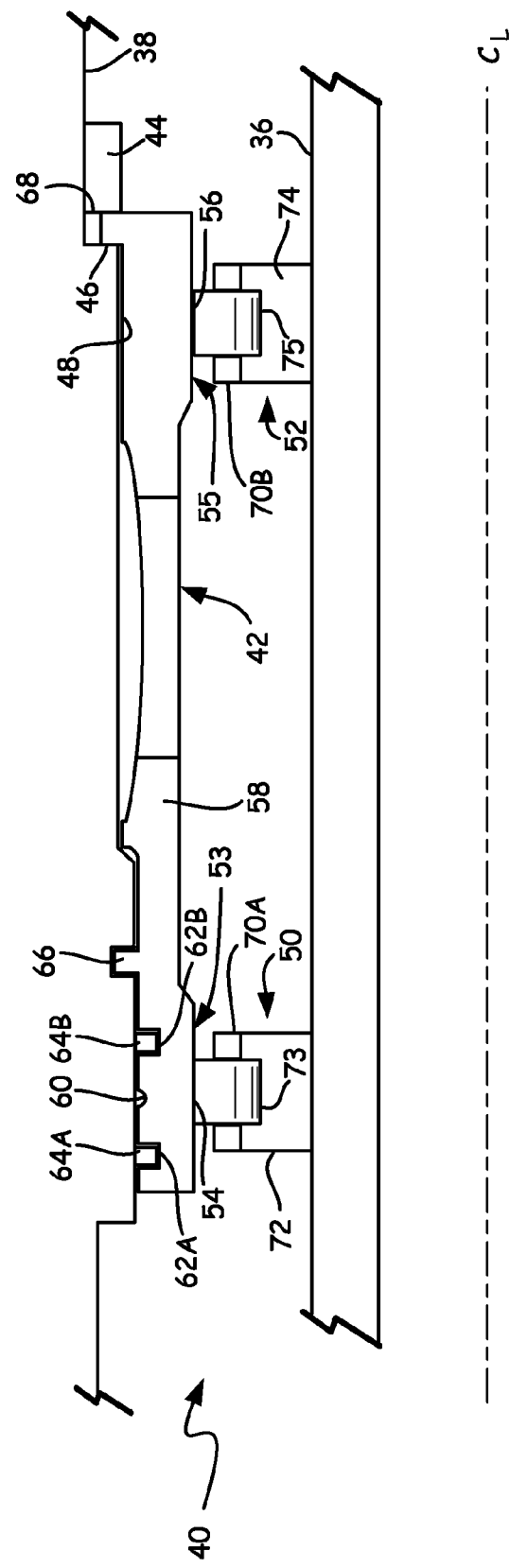
FIG. 2 is a cross-sectional view of a bearing arrangement.

In FIG. 2, a cross-sectional view of bearing arrangement 40 is shown. In the illustrated embodiment, bearing arrangement 40 includes the eighth and ninth bearings in gas turbine engine 10 (shown in FIG. 1) when counted from the front. These are the rearmost two bearings in gas turbine engine 10. However, indications of direction such as "forward" and "rearward" are used in this discussion merely in reference to the embodiment of FIG. 1, and are not intended to limit the invention.

The embodiment of bearing arrangement 40 shown in FIG. 2 includes power shaft 36, static member 38, bearing centering spring 42, nut 44, flange 46, contact surface 48, forward bearing 50, rearward bearing 52, forward outer ring 53, forward outer raceway 54, rearward outer ring 55, rearward outer raceway 56, port 58, oil groove 60, seal grooves 62A and 62B, seals 64A and 64B, forward lug 66, rearward lug 68, roller elements 70A and 70B, forward inner ring 72, forward inner raceway 73, rearward inner ring 74, rearward inner raceway 75, and longitudinal engine centerline axis $C_L$.

Bearing centering spring 42, in the depicted embodiment, is a single, monolithic component that has a cylindrical body with a retaining feature at the rearward end. Bearing centering spring 42 is comprised of a ferrous metal material, such as M50 bearing steel. In the illustrated embodiment, the retaining feature is flange 46, which is retained to the inner portion of a bore in static member 38 by nut 44. More specifically, flange 46 is axially sandwiched between static member 38 and nut 44, wherein nut 44 is threaded into the bore in static member 38. Bearing centering spring 42 is radially centered in static member 38 because contact surface 48 is similar in size to the bore in static member 38. In one embodiment, contact surface 48 is sized to create a press-fit between bearing centering spring 42 and static member 38.

Bearing centering spring 42 includes the outer rings and the outer raceways for both forward bearing 50 and rearward bearing 52. More specifically, bearing centering spring 42 includes forward outer ring 53 with forward outer raceway 54 proximate the forward end of bearing centering spring 42. Bearing centering spring 42 also includes rearward outer ring 55 with rearward outer raceway 56 proximate the rearward end of bearing centering spring 42. Between forward outer ring 53 and rearward outer ring 55 is a plurality of ports 58 through the body of bearing centering spring 42.

In the illustrated embodiment, contact surface 48 is on rearward outer ring 55, directly radially outward from rearward outer raceway 56. The rearward end of bearing centering spring 42 is designed to be in rigidly restrained by static member 38, but the forward end of bearing centering spring 42 is cantilevered from contact surface 48 and is spaced apart from static member 38. In one embodiment, there is a gap of about 0.127 mm (0.005 in.) (i.e. in the range of 0.0762 mm to 0.178 mm (0.003 in. to 0.007 in.)) between bearing centering spring 42 and the bore in static member 38 proximate the forward end of bearing centering spring 42.

Because of the bending moments that occur due to operation with unbalanced rotating loads, the forward end of bearing centering spring 42 is oil damped. Therefore, oil groove 60 is in forward outer ring 53, directly radially outward from forward outer raceway 54. Oil groove 60 extends around the circumference of bearing centering spring 42. Oil groove 60 is positioned between seal grooves 62A and 62B that are also in forward outer ring 53. Seal grooves 62A and 62B are both positioned forward of the plurality of ports 58. Oil groove 60 is fluidly connected to a pressurized oil source (not shown), and seals 64A and 64B are positioned in seal grooves 62A and 62B, respectively. During operation of gas turbine engine 10 (shown in FIG. 1), pressurized oil is pumped into oil groove 60 to fill the gap between bearing centering spring 42 and static member 38. This oil is inhibited from leaking out of this region of bearing arrangement 40 by seals 64A and 64B.

In addition, due to the loads on bearing centering spring 42 during operation, bearing centering spring has two sets of anti-rotation features. The first is forward lug 66, which extends radially outward from bearing centering spring 42 and is positioned between seal groove 62B and the plurality of ports 58. Forward lug 66 prevents rotation of the forward portion of bearing centering spring 42 relative to the rearward portion. This occurs because forward lug 66 is positioned in a slot in static member 38 that is, in one embodiment, 0.254 mm to 0.381 mm (0.010 in. to 0.015 in.) wider than forward lug 66. Forward lug 66 can contact static member 38 when bearing centering spring 42 experiences a bending load because a bending load can cause a resultant twisting load. The second anti-rotation feature is rearward lug 68, which extends radially outward from the radially outer edge of flange 46. Rearward lug 68 is positioned in a slot in static member 38, and rearward lug 68 contacts static member 38 to prevent rotation of bearing centering spring 42 as a whole.

Bearing centering spring 42 provides forward outer ring 53 for forward bearing 50 and rearward outer ring 55 for rearward bearing 52. In the illustrated embodiment, forward bearing 50 further comprises a plurality of roller elements 70A and forward inner ring 72 with forward inner raceway 73. Forward inner ring 72 is connected to the outer portion of power shaft 36. Roller elements 70A engage and roll along forward outer raceway 54 and forward inner raceway 73 to provide smooth and controlled rotation of power shaft 36 relative to static member 38. Similarly, rearward bearing 52 further comprises a plurality of roller elements 70B and rearward inner ring 74 with rearward inner raceway 75. Rearward inner ring 74 is connected to the outer portion of power shaft 36 and is separate from forward inner ring 72. Roller elements 70B engage and roll along rearward outer raceway 56 and rearward inner raceway 75 to provide smooth and controlled rotation of power shaft 36 relative to static member 38.

The components and configuration of bearing arrangement 40 as shown in FIG. 2 allow for both bearings 50 and 52 to share a single bearing centering spring 42. Only one nut 44 is required to retain both outer rings 53 and 55, so the distance between bearings 50 and 52 can be minimized. These features allow for bearing arrangement 40 to have a very compact axial length. In addition, power shaft 36 is stabilized by two bearings 50 and 52 in this region, which adds a further degree of precision to the rotation of power shaft 36 than if only one bearing were employed.

Depicted in FIG. 2 is one embodiment of the present invention, to which there are alternative embodiments. For example, bearing centering spring 42 can be restrained on the forward end. In such an embodiment, flange 46 and nut 44 would be positioned proximate the forward end of bearing centering spring 42. For another example, roller elements 70A and 70B can be other types bearing elements, such as balls. For a further example, inner rings 72 and 74 can be features of a single, monolithic component. For yet another example, bearing arrangement 40 can be utilized in another location in gas turbine engine 10 (shown in FIG. 1).

Figure 3:
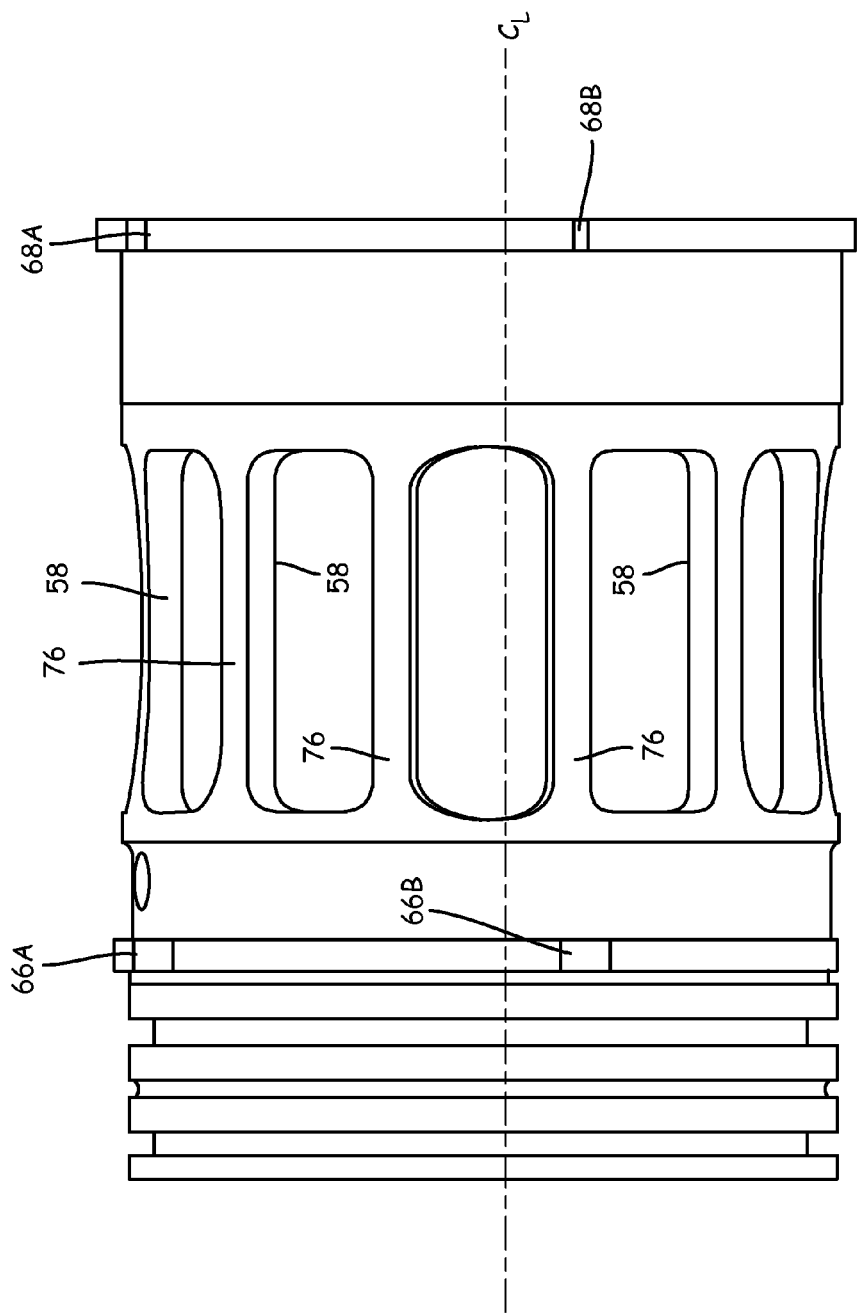
FIG. 3 is a side view of a bearing centering spring.

FIG. 3 is a side view of bearing centering spring 42. In FIG. 3, forward lugs 66A and 66B and rearward lugs 68A and 68B are visible. In the illustrated embodiment, forward lug 66A is identical to forward lug 66B, but rearward lug 68A is circumferentially larger than rearward lug 68B. This provides a clocking function so that bearing centering spring 42 can only be installed in one orientation.

Also visible in the illustrated embodiment of FIG. 3 are ten ports 58 (because two ports 58 are visible through each of the five openings). Interspersed between ports 58 are ten beams 76 (although only six are visible) that connect the forward portion of bearing centering spring 42 to the rearward portion. The diameter of bearing centering spring 42 is about 63.5 mm (2.5 in.) (i.e. in the range of 57.2 mm to 69.9 mm (2.25 in. to 2.75 in.)). Beams are less than 38.1 mm (1.5 in.) long and are preferably about 25.4 mm (1.0 in.) (i.e. in the range of 22.9 mm to 27.9 mm (0.9 in. to 1.1 in.)). Beams 76 provide bearing centering spring 42 with a spring rate that is less than 1,790 kg/mm (100,000 lbs./in.) and is preferably about 893 kg/mm (50,000 lbs./in.) (i.e. in the range of 804 kg/mm to 982 kg/mm (45,000 lbs/in. to 55,000 lbs./in.)). The spring rate is measured in a radial direction at the location of forward bearing 50 (shown in FIG. 2) because an unbalanced rotating load would impose a radially-oriented bending moment at that location given that forward bearing 50 is cantilevered while rearward bearing 52 (shown in FIG. 2) is fixed in place. Therefore, every port 58 has the same dimensions and every beam 76 has the same dimensions, such that bearing centering spring 42 has substantially the same reaction to radial loading regardless of the location of the load.

Depicted in FIG. 3 is one embodiment of the present invention, to which there are alternative embodiments. For example, rearward lugs 68A and 68B can be identical, and forward lugs 66A and 66B can be different from each other, for example, for clocking purposes. For another example, the dimensions of bearing centering spring 42 can be scaled up or down from the specific ranges set forth previously.

Discussion of Possible Embodiments

The following are non-exclusive descriptions of possible embodiments of the present invention.

A bearing centering spring according to an exemplary embodiment of this disclosure, among other possible things, includes a cylindrical body having a first end, a second end, an inner surface, and an outer surface; a first outer ring proximate the first end, the first outer ring including a first outer raceway on the inner surface; a second outer ring proximate the second end, the second outer ring including a second outer raceway on the inner surface; a retaining feature at the second end; and a plurality of ports through the body positioned between the first outer ring and the second outer ring.

The bearing centering spring of the preceding paragraph can optionally include, additionally and/or alternatively, any one or more of the following features, configurations and/or additional components:

A further embodiment of the foregoing bearing centering spring, wherein a contact surface on the outer surface can be directly radially outward of the second outer raceway.

A further embodiment of any of the foregoing bearing centering springs, wherein a first seal groove can be on the outer surface proximate the first end; a second seal groove can be on the outer surface positioned between the first seal groove and the plurality of ports; and an oil groove can be on the outer surface positioned between the first and second seal grooves.

A further embodiment of any of the foregoing bearing centering springs, wherein an anti-rotation lug can extend radially from the outer surface positioned between the second seal groove and the plurality of ports.

A further embodiment of any of the foregoing bearing centering springs, wherein the retaining feature can be a flange.

A further embodiment of any of the foregoing bearing centering springs, wherein the retaining feature can include an anti-rotation lug that extends radially from the flange.

A bearing arrangement according to an exemplary embodiment of this disclosure, among other possible things, includes an outer member having an inner portion; an inner member that is rotatable with respect to the outer member, the inner member having an outer portion; a first inner ring connected to the outer portion and including a first inner raceway; a second inner ring connected to the outer portion and including a second inner raceway; a first plurality of bearing elements in engagement with the first inner raceway; a second plurality of bearing elements in engagement with the second inner raceway; and a bearing centering spring retained to the outer member, the bearing centering spring comprising: a first outer ring including a first outer raceway in engagement with the first plurality of bearing elements proximate a first end of the bearing centering spring; a second outer ring including a second outer raceway in engagement with the second plurality of bearing elements proximate a second end of the bearing centering spring; a plurality of ports positioned between the first outer ring and the second outer ring; and a retaining feature at the second end of the bearing centering spring.

The bearing arrangement of the preceding paragraph can optionally include, additionally and/or alternatively, any one or more of the following features, configurations and/or additional components:

A further embodiment of the foregoing bearing arrangement, wherein the bearing centering spring can further comprise: a contact surface on an outer surface of the bearing centering spring positioned directly radially outward of the second outer raceway; wherein the contact surface contacts the inner portion of the outer member.

A further embodiment of any of the foregoing bearing arrangements, wherein the outer surface of the bearing centering spring that is directly radially outward of the first outer raceway can be configured to be spaced apart from the inner portion of the outer member.

A further embodiment of any of the foregoing bearing arrangements, wherein the bearing centering spring can further comprise: a first seal groove on the outer surface proximate the first end; a second seal groove on the outer surface positioned between the first seal groove and the plurality of ports; and an oil groove on the outer surface positioned between the first and second seal grooves.

A further embodiment of any of the foregoing bearing arrangements, wherein a first seal can be positioned in the first seal groove, the first seal configured to form a seal between the bearing centering spring and the outer member; and a second seal can be positioned in the first seal groove, the second seal configured to form a seal between the bearing centering spring and the outer member.

A further embodiment of any of the foregoing bearing arrangements, wherein the bearing centering spring can further comprise: an anti-rotation lug that extends radially from the outer surface positioned between the first outer ring and the plurality of ports, the anti-rotation lug being configured to contact the outer member.

A further embodiment of any of the foregoing bearing arrangements, wherein the retaining feature can be a flange.

A further embodiment of any of the foregoing bearing arrangements, wherein the bearing centering spring can further comprise: an anti-rotation lug that extends radially from the flange, the anti-rotation lug being configured to contact the outer member.

A further embodiment of any of the foregoing bearing arrangements, wherein a nut can be connected to the outer member; wherein flange is retained between the static member and the nut.

A further embodiment of any of the foregoing bearing arrangements, wherein the nut can be connected to the inner portion of the outer member.

A gas turbine engine according to an exemplary embodiment of this disclosure, among other possible things, includes a low spool including a low pressure compressor connected to a low pressure turbine via a low shaft; a high spool including a high pressure compressor positioned downstream of the low pressure compressor connected to a high pressure turbine positioned upstream of the low pressure turbine via a high shaft; a combustor positioned between the high pressure compressor and the high pressure turbine; a power spool including a power turbine positioned downstream of the low pressure turbine and a power shaft; and a bearing arrangement for the power shaft, the bearing arrangement including a bearing centering spring comprising: a first outer ring including a first outer raceway proximate a first end of the bearing centering spring; a second outer ring including a second outer raceway proximate a second end of the bearing centering spring; a plurality of ports positioned between the first ring and the second ring; and a retaining feature at the second end of the bearing centering spring.

The gas turbine engine of the preceding paragraph can optionally include, additionally and/or alternatively, any one or more of the following features, configurations and/or additional components:

A further embodiment of the foregoing gas turbine engine, wherein the first outer ring can be utilized in an eighth bearing and the second outer ring can be utilized in a ninth bearing of the gas turbine engine.

A further embodiment of any of the foregoing gas turbine engines, wherein the gas turbine engine can further comprise: a pressurized oil source; wherein the bearing centering spring can further comprise: an oil groove that is fluidly connected to the pressurized oil source.

A further embodiment of any of the foregoing gas turbine engines, wherein the gas turbine engine can further comprise: a static member; and a nut connected to the static member; wherein the retaining feature can be a flange; and wherein flange can be retained between the static member and the nut.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bearing centering spring comprising:
   a cylindrical body having a first end, a second end, an inner surface, and an outer surface;
   a first outer ring proximate the first end, the first outer ring including a first outer raceway on the inner surface;
   a second outer ring proximate the second end, the second outer ring including a second outer raceway on the inner surface;
   a retaining feature at the second end;
   a plurality of ports through the body positioned between the first outer ring and the second outer ring;
   a first seal groove on the outer surface proximate the first end;
   a second seal groove on the outer surface positioned between the first groove and the plurality of ports;
   an oil groove on the outer surface positioned between the first and second seal grooves; and
   an anti-rotation lug that extends radially from the outer surface positioned between the second seal groove and the plurality of ports.

2. The bearing centering spring of claim 1, further comprising:
   a contact surface on the outer surface directly radially outward of the second outer raceway.

3. The bearing centering spring of claim 1, wherein the retaining feature is a flange.

4. The bearing centering spring of claim 3, wherein the retaining feature includes an anti-rotation lug that extends radially from the flange.

5. A bearing arrangement comprising:
   an outer member having an inner portion;
   an inner member that is rotatable with respect to the outer member, the inner member having an outer portion;
   a first inner ring connected to the outer portion and including a first inner raceway;
   a second inner ring connected to the outer portion and including a second inner raceway;
   a first plurality of bearing elements in engagement with the first inner raceway;
   a second plurality of bearing elements in engagement with the second inner raceway;
   a bearing centering spring retained to the outer member, the bearing centering spring comprising:
      a first outer ring including a first outer raceway in engagement with the first plurality of bearing elements proximate a first end of the bearing centering spring;
      a second outer ring including a second outer raceway in engagement with the second plurality of bearing elements proximate a second end of the bearing centering spring;
      a plurality of ports positioned between the first outer ring and the second outer ring;
      a retaining feature at the second end of the bearing centering spring; and
      an anti-rotation lug that extends radially from the outer surface positioned between the first outer ring and the plurality of ports, the anti-rotation lug being configured to contact the outer member.

6. The bearing arrangement of claim 5, wherein the bearing centering spring further comprises:
   a contact surface on an outer surface of the bearing centering spring positioned directly radially outward of the second outer raceway;
   wherein the contact surface contacts the inner portion of the outer member.

7. The bearing arrangement of claim 6, wherein the outer surface of the bearing centering spring that is directly radially outward of the first outer raceway is configured to be spaced apart from the inner portion of the outer member.

8. The bearing arrangement of claim 5, wherein the bearing centering spring further comprises:

a first seal groove on the outer surface proximate the first end;

a second seal groove on the outer surface positioned between the first seal groove and the plurality of ports; and an oil groove on the outer surface positioned between the first and second seal.

9. The bearing arrangement of claim 8, and further comprising:

a first seal positioned in the first seal groove, the first seal configured to form a seal between the bearing centering spring and the outer member; and a second seal positioned in the first seal groove, the second seal configured to form a seal between the bearing centering spring and the outer member.

10. The bearing arrangement of claim 5, wherein the retaining feature is a flange.

11. The bearing arrangement of claim 10, wherein the bearing centering spring further comprises:

an anti-rotation lug that extends radially from the flange, the anti-rotation lug being configured to contact the outer member.

12. The bearing arrangement of claim 10, further comprising:

a nut connected to the outer member;

wherein flange is retained between the static member and the nut.

13. The bearing arrangement of claim 12, wherein the nut is connected to the inner portion of the outer member.

14. A gas turbine engine comprising:

a low spool including a low pressure compressor connected to a low pressure turbine via a low shaft;

a high spool including a high pressure compressor positioned downstream of the low pressure compressor connected to a high pressure turbine positioned upstream of the low pressure turbine via a high shaft;

a combustor positioned between the high pressure compressor and the high pressure turbine;

a power spool including a power turbine positioned downstream of the low pressure turbine and a power shaft; and a bearing arrangement for the power shaft, the bearing arrangement comprising:

an outer member having an inner portion;

an inner member that is rotatable with respect to the outer member, the inner member having an outer portion;

a first inner ring connected to the outer portion and including a first inner raceway;

a second inner ring connected to the outer portion and including a second inner raceway;

a first plurality of bearing elements in engagement with the first inner raceway;

a second plurality of bearing elements in engagement with the second inner raceway;

a bearing centering spring retained to the outer member, the bearing centering spring comprising:

a first outer ring including a first outer raceway in engagement with the first plurality of bearing elements proximate a first end of the bearing centering spring;

a second outer ring including a second outer raceway in engagement with the second plurality of bearing elements proximate a second end of the bearing centering spring;

a plurality of ports positioned between the first outer ring and the second outer ring;

a retaining feature at the second end of the bearing centering spring; and an anti-rotation lug that extends radially from the outer surface positioned between the first outer ring and the plurality of ports, the anti-rotation lug being configured to contact the outer member.

15. The gas turbine engine of claim 14, wherein the first outer ring is utilized in an eighth bearing and the second outer ring is utilized in a ninth bearing of the gas turbine engine.

16. The gas turbine engine of claim 14, further comprising:

a pressurized oil source;

wherein the bearing centering spring further comprises:

an oil groove that is fluidly connected to the pressurized oil source.

17. The gas turbine engine of claim 14, the gas turbine engine further comprises:

a static member; and a nut connected to the static member;

wherein the retaining feature is a flange; and wherein flange is retained between the static member and the nut.

* * * * *